United States Patent [19]

Strock et al.

[11] Patent Number: 5,766,320
[45] Date of Patent: Jun. 16, 1998

[54] INTEGRAL DEAERATOR FOR A HEAT PIPE STEAM CONDENSER

[75] Inventors: Thomas W. Strock, Jackson Township, Stark County, Ohio; Fred G. Russell, Sugar Land, Tex.

[73] Assignee: Hudson Products Corporation, New Orleans, La.

[21] Appl. No.: 749,303

[22] Filed: Nov. 14, 1996

[51] Int. Cl.⁶ .................................................. B01D 19/00
[52] U.S. Cl. ........................... 96/181; 55/466; 95/254; 96/204
[58] Field of Search .................. 96/155, 181, 199, 96/200, 201, 202, 203, 204, 218; 95/254, 260, 262, 264, 288; 55/233, 242, 466; 122/489

[56] References Cited

U.S. PATENT DOCUMENTS

| | | | |
|---|---|---|---|
| 570,790 | 11/1896 | Gaiennie | 122/489 |
| 894,407 | 7/1908 | Suzuki | 122/489 |
| 1,401,100 | 12/1921 | Ehrhart | 96/201 |
| 1,552,071 | 9/1925 | McDermet | 96/203 |
| 1,645,132 | 10/1927 | Gibson | 96/203 |
| 1,677,890 | 7/1928 | Gibson | 96/181 |
| 1,742,998 | 1/1930 | McDermet | 96/203 |
| 2,078,288 | 4/1937 | Sherman | 95/264 |
| 2,452,716 | 11/1948 | Bergquist | 95/264 |
| 3,057,333 | 10/1962 | Kuhner | 122/491 |
| 3,813,037 | 5/1974 | Bekedam | 237/9 R |
| 3,933,449 | 1/1976 | Miselem | 55/218 |
| 4,272,499 | 6/1981 | Cason et al. | 423/242 |
| 4,345,916 | 8/1982 | Richards et al. | 55/223 |
| 4,698,076 | 10/1987 | Bekedam | 96/203 |
| 4,981,113 | 1/1991 | Kannan et al. | 122/441 |
| 5,203,286 | 4/1993 | Youssef | 122/488 |
| 5,405,435 | 4/1995 | Bekedam | 96/158 |
| 5,476,525 | 12/1995 | Bekedam | 55/218 |

OTHER PUBLICATIONS

Arallone, E.A. & Baumeister, III, T., *Marks' Standard Handbook for Mechanial Engineers*, Ninth Edition, McGraw-Hill Book Company, 1987, pp. 9–79.

Primary Examiner—C. Scott Bushey
Attorney, Agent, or Firm—Robert J. Edwards; Eric Marich

[57] ABSTRACT

An integral deaerator for a heat pipe steam condenser has a main steam duct connected to a heat pipe steam condenser duct by a riser. The heat pipe steam condenser duct is inclined slightly toward the riser and a weir is positioned at the connection between the riser and heat pipe steam condenser duct to prevent condensate from draining directly into the riser. The heat pipe steam condenser duct has a drain for draining a condensate from within the heat pipe steam condenser duct to a distribution header for distributing the condensate within the riser. Steam is provided to the main steam duct for condensation in the heat pipe steam condenser and while in transit, the steam heats and deaerates the condensate. At least one drain boot is connected to the bottom of the main steam duct for draining deaerated condensate.

12 Claims, 2 Drawing Sheets 5,766,320

INTEGRAL DEAERATOR FOR A HEAT PIPE STEAM CONDENSER

FIELD AND BACKGROUND OF THE INVENTION

The invention relates generally to the field of degasifying boiler feedwater used for steam generation, and in particular to an integrated deaerator for a heat pipe steam condenser.

Deaerators are part of the condensate storage system of a Rankine thermodynamic steam cycle, electric power plant. Deaerators are usually located downstream of a condenser unit, and conventionally, they are stand-alone components connected to the steam condensing and storage system of the power plant.

Deaerators are used to degasify boiler feedwater and thereby reduce equipment corrosion. Deaerators are also used to heat the feedwater regeneratively, thus improving the thermodynamic cycle efficiency of the power plant.

The steam condenser, which typically operates at vacuum pressures, is the first stage of deaeration, where non-condensible gases are separated from the condensing steam and continuously purged from the system. However, sub-cooling the liquid to any extent in the condenser results in some gas being dissolved in the liquid. The deaerator is designed to remove as much of this dissolved gas as possible. Dissolved gas remaining in the liquid after treatment by the deaerator is removed by a boiler water chemical treatment system.

Deaerators operate by heating the subcooled condensate to near the saturation point, where the gas solubility in the liquid approaches zero. After or during heating, gases are removed by mechanically agitating the liquid through trays or sprays. In order for mechanical agitation to be effective, the vapor/liquid interface surface area must be large to provide a means for the gas to escape.

The most important benefit of a deaerator is the elimination of condensate subcooling that occurs in conventional steam condensers, in particular air-cooled vacuum steam condensers. Subcooled condensate is unavoidable since a drop in steam pressure occurs in the thousands of small, finned tubes used for condensation in an air-cooled condenser. The pressure drop reduces the condensate saturation temperature and pressure. Thus, the condensate temperature drops below the initial steam saturation temperature.

Examples of deaerators can be found in U.S. Pat. No. 5,203,286, which teaches a steam deaerator having two columns between a steam inlet and a feed water holding tank. The two column arrangement creates a counter current flow for passing steam and water therethrough in order to deaerate it. This deaerator is a stand-alone system and is not integrated with the pipe supplying steam to the vacuum steam condenser as in the present invention.

U.S. Pat. No. 5,405,435 discloses a deaerator unit using gravity to assist the circulation in the system. Water enters the upper scrubbing section of the unit and passes through into a lower section having a monitored water level, while steam passes from the lower section to the upper section for venting from the system. The deaerator does not require a transfer pump to effect the deaeration of water, and it is not integrated with steam ducts.

Conventional condenser systems require a separate deaerator/condensate storage tank from the heat exchange unit because of different operating pressures. Conventional designs, with an elevated main steam duct, thousands of condenser tubes, lower drain pots, and water leg seals, cause some steam pressure drop that requires the main steam duct to be isolated from the condensate. Piping condensate to a stand-alone tank and deaerator for degassification is a simple solution used in these designs. However, this solution is more costly than integrating the deaerator into the condensing system steam piping according to the present invention.

SUMMARY OF THE INVENTION

It is an object of the present invention to provide an integrated deaerator for a heat pipe steam condenser which is economical to use, both in terms of cost and space utilized.

Accordingly, a deaerator which is integrated with the heat pipe steam condenser is provided which reduces the total condensing system cost by at least 3%, and which eliminates the need for a separate condensate tank.

The deaerator of the invention is an integral deaerator for use with a heat pipe steam condenser. Several integrated deaerators are used along the length of a main steam duct to connect multiple heat pipe steam ducts to the main steam duct.

Each integral deaerator has a riser extending vertically from the main steam duct and ending in a riser cap. A heat pipe steam condenser steam duct extends approximately perpendicular from both the longitudinal axis of the main steam duct and the vertical axis of the riser. The heat pipe steam condenser steam duct has a drain proximate the riser wall in the lower portion of the heat pipe steam condenser steam duct. A weir blocks the lower portion of the heat pipe steam condenser steam duct from communicating directly with the interior of the riser.

Steam condensate must travel through the drain in each steam condenser steam duct to a distribution manifold located between the main steam duct and the heat pipe steam condenser steam duct entry in the riser. The condensate steam is ejected through spray pipes in the distribution manifold over an optional condenser tray located above the main steam duct. A drain boot leading to a feedwater pump is located in the lower portion of the main steam duct.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DETAILED DESCRIPTION OF THE PREFERRED EMBODIMENTS

Figure 1:
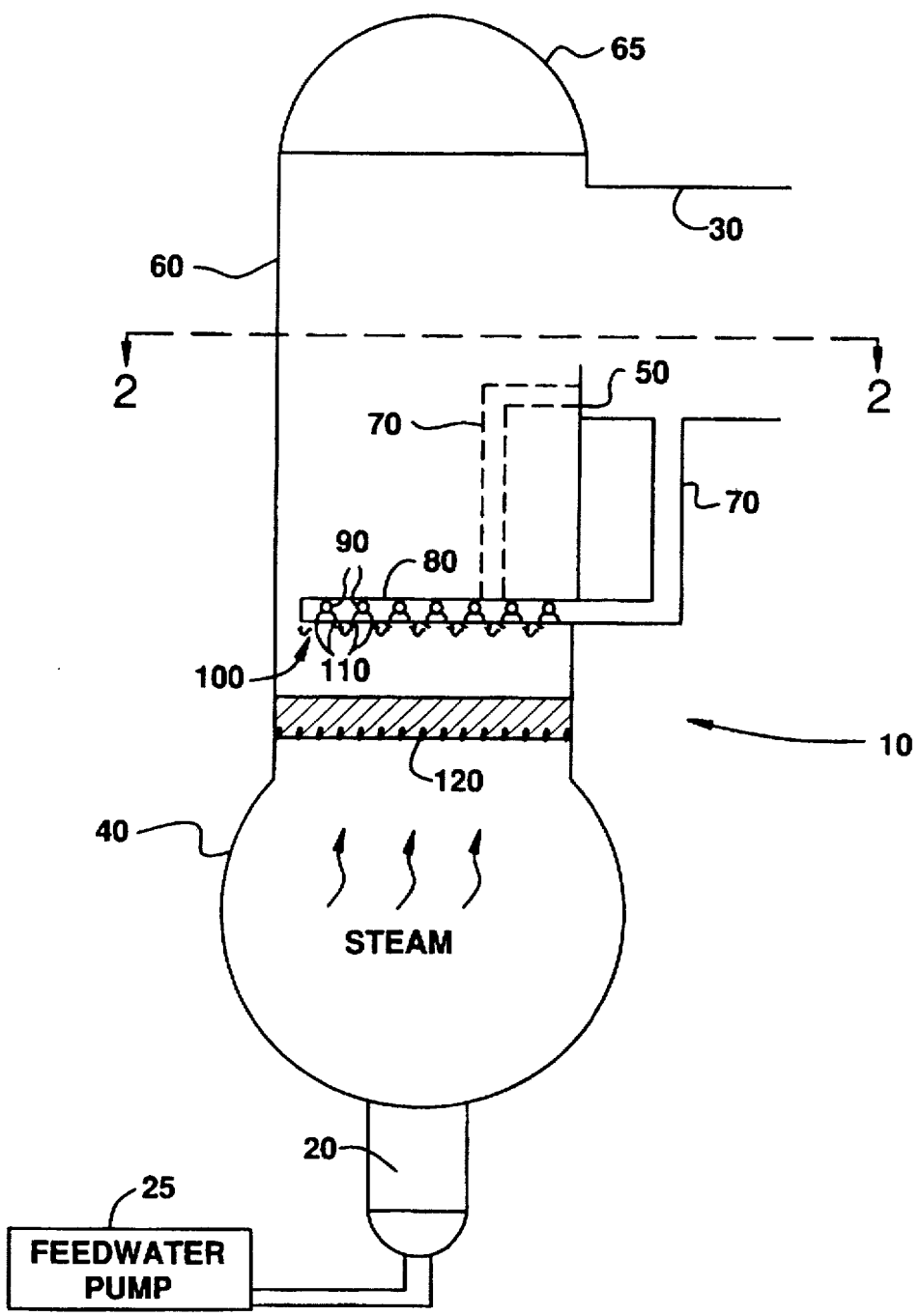
FIG. 1 is a side elevation sectional view of an integrated deaerator of the present invention.
Figure 2:
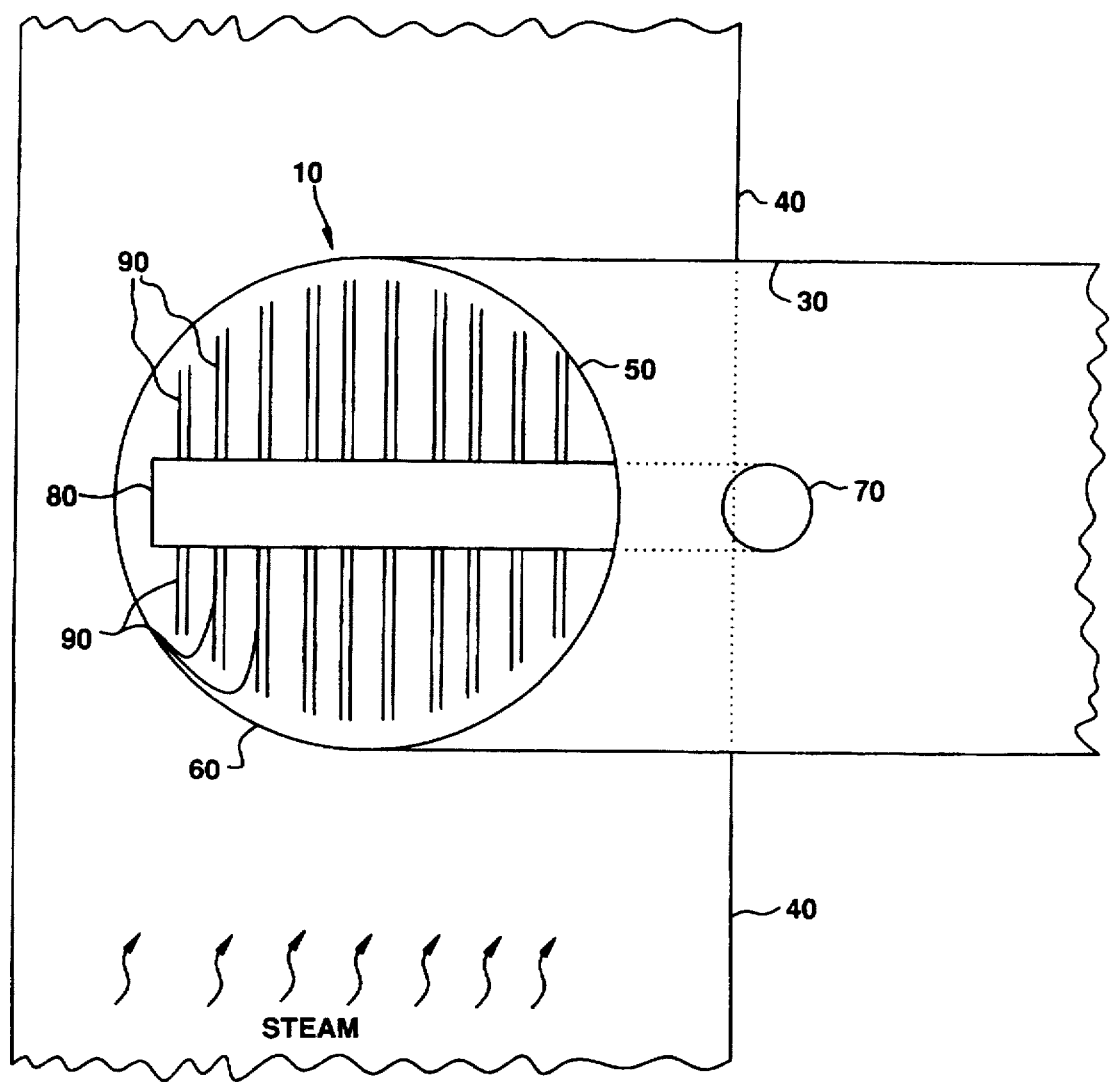
FIG. 2 is a top section view taken along line 2—2 of FIG. 1.

Referring now to the drawings, in which like reference numerals have been used to identify the same or similar elements, FIG. 1 has the integrated deaerator of the present invention, generally designated 10, connected between main steam duct 40 from a turbine exit (not shown) and one or more heat pipe steam condenser ducts 30. At the lower end of main steam duct 40, a drain boot 20 provides a passage to a boiler feedwater pump 25.

Main steam duct 40 is oriented perpendicular to each of the one or more heat pipe steam condenser ducts 30, and is inclined slightly downwardly toward drain boot 20.

Each heat pipe steam condenser duct 30 is of a type which collects condensate from the lower end of a plurality of heat pipes (not shown) encased within another section of the heat pipe steam condenser duct 30. The heat pipe steam condenser duct 30 is slightly downwardly inclined toward the integrated deaerator 10.

Integrated deaerator 10 has cylindrical riser 60 connected to a top side of main steam duct 40 at one end and sealed with riser cap 65 at the other end. A weir 50 is positioned at the connection between heat pipe steam condenser duct 30 and the side of riser 60. Adjacent to weir 50, within heat pipe steam condenser duct 30, drain pipe 70 is connected at the bottom of duct 30.

Drain pipe 70 is attached through riser 60 to distribution manifold 80. Manifold 80 is positioned horizontally within riser 60 above main steam duct 40 and below weir 50. A plurality of distribution pipes 90 having discharge openings 110 extend horizontally perpendicular to the manifold 80. A tray 120 may be positioned between manifold 80 and pipes 90 and the top of main steam duct 40. The tray 120 provides additional surface area to allow for intimate contact between steam flowing in main steam duct 40 upthrough tray 120 and condensed liquid 100 provided thereabove, and may thus advantageously comprise chevron type structures or contain packing material or elements (spheres, etc.).

In operation, vacuum steam flows from the power plant steam turbine (not shown) to the main steam duct 40 and then flows upwardly through riser 60. Condensate liquid 100 collected in heat pipe steam condenser duct 30 drains toward riser 60 and weir 50. The condensate liquid 100 is prevented from entering riser 60 at the connection between riser 60 and heat pipe steam condenser duct 30 by weir 50. Instead, the liquid 100 must travel through drain pipe 70 to distribution manifold 80 and distribution pipes 90, where it is sprayed over tray 120 through discharge openings 110.

As described above, the liquid flow is downward and counter to the high-velocity vacuum steam flow upward. The steam riser 60 area and vacuum steam velocity are selected to provide turbulent mixing of the vapor and liquid flows, but prevent large amounts of liquid 100 from being carried upward or flooding the tray 120. The turbulent mixing breaks the liquid streams from discharge openings 110 into droplets. This provides a large liquid/vapor surface for both heating of the droplets and deaeration. Gases that are removed from the liquid are swept into the heat pipe steam condenser duct 30 to the condenser's air removal system (not shown).

One or more trays 120 may be positioned below the distribution manifold 80 and pipes 90 to enhance the heating and deaeration of the liquid 100. The trays 120 may be of the counterflow, disk-and-doughnut, crossflow, or any other known type of tray or packing (spheres, material, etc.) design used for deaeration. Additionally, the liquid 100 does not have to be sprayed, but can instead merely be delivered to the trays 120 for effective heating and deaeration to occur.

Deaerated condensate then drains into main steam duct 40, and flows toward drain boot 20 and to feedwater supply pump 25. The main steam duct 40 effectively replaces a separate condensate tank used in conventional deaerators. Accordingly, the main steam duct 40 is offset below any steam turbines to prevent condensate from flowing to the turbines (not shown). Additionally, high and low condensate level monitors of any known type may be included in the steam duct 40 for monitoring the liquid 100 level therein.

In a large plant, several heat pipe steam condenser ducts 30 and deaerators 10 are used, with one deaerator 10 connecting each of the heat pipe steam condenser ducts 30 to the main steam duct 40. In such a case, the single drain boot 20 may be provided at any convenient location in main steam duct 40.

Advantages of the invention include the passive nature of its operation; no moving parts are required, thereby reducing cost and maintenance. Further, the weir 50 and drain 70 create a static pressure head which overcomes the pressure loss experienced at each of the distribution pipes 90 and discharge openings 110.

Optionally, the discharge openings 110 may be oriented upward or to the side to create a crossflow of liquid 100, depending on the operating conditions and desired deaeration configuration within the riser 60. The discharge openings 110 may be simple holes drilled in distribution pipes 90 or conventional spray nozzles attached to distribution pipes 90. Alternatively, the drain pipe 70 can be positioned within riser 60, if space permits.

While a specific embodiment of the invention has been shown and described in detail to illustrate the application of the principles of the invention, it will be understood that the invention may be embodied otherwise without departing from such principles.

We claim:

1. An integral deaerator for a heat pipe steam condenser comprising:

a main steam duct oriented substantially longitudinally, and having a top and a bottom;

an heat pipe steam condenser duct oriented substantially longitudinally having a riser opening at one end;

a riser connecting the main steam duct and the heat pipe steam condenser duct, the riser connected at the riser opening and the top of the main steam duct;

a weir positioned at the riser opening;

drain means for draining a condensate from within the heat pipe steam condenser duct; and distribution means connected to the drain means for distributing the condensate within the riser.

2. An integral deaerator according to claim 1, further comprising at least one drain boot connected to the bottom of the main steam duct for draining condensate.

3. An integral deaerator according to claim 2, further comprising steam means for providing steam to the main steam duct.

4. An integral deaerator according to claim 1, wherein the distribution means comprises a distribution header connected to said drain means and plurality of distribution pipes each having a plurality of openings connected to said distribution header.

5. An integral deaerator according to claim 4, wherein the plurality of openings are oriented downwardly.

6. An integral deaerator according to claim 4, wherein the plurality of openings are oriented upwardly.

7. An integral deaerator according to claim 6, wherein the plurality of openings comprise nozzles.

8. An integral deaerator according to claim 4, wherein the distribution means further comprises one of a counterflow, disk-and-doughnut and crossflow tray positioned within the riser below the distribution pipes.

9. An integral deaerator according to claim 3, further comprising one of a counterflow, disk-and-doughnut and crossflow tray positioned within the riser below the distribution means.

10. An integral deaerator according to claim 3, further comprising tray means containing one of packing elements or material for providing additional surface area to promote intimate contact between the steam and the condensate.

11. An integral deaerator according to claim 1, wherein the drain means and weir are located inside the riser.

12. An integral deaerator according to claim 1, wherein the heat pipe steam condenser duct is inclined slightly downward toward the riser.

* * * * *